US 8,537,528 B2

(12) United States Patent
Lee et al.

(10) Patent No.: US 8,537,528 B2
(45) Date of Patent: Sep. 17, 2013

(54) MOBILE TERMINAL

(75) Inventors: Yunjoo Lee, Gyeonggi-Do (KR);
Jaichul Kim, Gyeonggi-Do (KR);
Hyeongwoo Ji, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 215 days.

(21) Appl. No.: 13/088,115

(22) Filed: Apr. 15, 2011

(65) Prior Publication Data
US 2012/0026656 A1 Feb. 2, 2012

(30) Foreign Application Priority Data
Jul. 27, 2010 (KR) .................. 10-2010-0072602

(51) Int. Cl.
*H05K 5/00* (2006.01)
(52) U.S. Cl.
USPC .............. 361/679.01; 361/679.02; 361/679.3; 361/679.39; 361/679.43; 361/679.56
(58) Field of Classification Search
USPC .............. 455/575.1, 575.4, 572; 361/679.01, 361/679.02, 679.03, 679.39, 679.43, 679.56; 439/345, 308, 346, 327
See application file for complete search history.

(56) References Cited

U.S. PATENT DOCUMENTS

| 6,529,714 | B1 * | 3/2003 | Nakamura et al. ......... 455/575.1 |
| 7,663,557 | B2 * | 2/2010 | Joo et al. ..................... 343/702 |
| 2008/0064455 | A1 | 3/2008 | Joo et al. |
| 2008/0166907 | A1 | 7/2008 | Sanford et al. |

FOREIGN PATENT DOCUMENTS

| CN | 2011-23013 Y | 9/2008 |
| CN | 2012-60162 Y | 6/2009 |
| EP | 0685894 A1 | 12/1995 |

* cited by examiner

*Primary Examiner* — Jayprakash N Gandhi
*Assistant Examiner* — Hung Dang
(74) *Attorney, Agent, or Firm* — Birch, Stewart, Kolasch & Birch, LLP

(57) ABSTRACT

Disclosed is a mobile terminal including a case having an inner space and a first opening formed at one end thereof to open the inner space, and a slider mounted to the case and slid through the first opening between a first state where a battery is disposed in the inner space and a second state where the battery is externally exposed, wherein the slider includes a slide unit configured to house the battery therein and slidably mounted to the case to be drawn out of the inner space, and a cover unit connected to the slide unit and configured to obscure the first opening in the first state.

18 Claims, 9 Drawing Sheets

MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2010-0072602, filed on Jul. 27, 2010, the contents of which is incorporated by reference herein in its entirety.

BACKGROUND OF THE INVENTION

1. Field of the Invention

This specification relates to a mobile terminal having a detachable battery.

2. Description of Related Art

Terminals may be divided into mobile/portable terminals and stationary terminals according to their mobility. Also, the mobile terminals may be categorized into a handheld terminal and a vehicle mount terminal according to whether it is directly portable by a user.

As it becomes multifunctional, the mobile terminal can be allowed to capture still images or moving images, play music or video files, play games, receive broadcast and the like, so as to be implemented.

Various new attempts have been made for the multimedia devices by hardware or software in order to implement such complicated functions. For example, a user interface environment is provided in order for users to easily and conveniently retrieve or select functions.

For hardware, a battery cover may be detachably coupled to a rear surface of the mobile terminal for replacement of a battery, or the like. However, the shape or structure of the battery cover may problematically spoil the esthetic appearance of the terminal.

BRIEF SUMMARY OF THE INVENTION

Therefore, in order to obviate the above-identifier problem, an aspect of the detailed description is to simplify a configuration of a case without externally exposing boundaries of cases.

To achieve these and other advantages and in accordance with the purpose of the present disclosure, as embodied and broadly described herein, there is provided a mobile terminal including a case having an inner space and a first opening formed at one end thereof to open the inner space, and a slider mounted to the case and slid through the first opening between a first state where a battery is disposed in the inner space and a second state where the battery is externally exposed, wherein the slider includes a slide unit configured to house the battery therein and slidably mounted to the case to be drawn out of the inner space, and a cover unit connected to the slide unit and configured to obscure the first opening in the first state.

As one aspect of the detailed description, the slide unit may include a slide member formed in parallel to a front surface of the case, wherein a window is disposed on the front surface of the case, protrusion members protruding from both side surfaces of the slide member and defining a housing space for housing the battery therein, and guide members formed at the protrusion members, respectively, and slidably coupled to guide rails formed at the case.

As another aspect of the detailed description, the cover unit may include a perpendicular portion formed at one end of the slide member in a perpendicular direction to a front surface of the slide member, and an extending portion extending from the perpendicular portion to be farther away from the case in the sliding direction of the slider.

As another aspect of the detailed description, the perpendicular portion may be configured to obscure the first opening in the first state. The extending portion may include a mounting space and a cover. The mounting space may be recessed into an end of the extending portion toward the case, and locking units, which are stopped at at least part of the case to lock the slider in the first state, may be mounted to the mounting space. The cover may be configured to cover the mounting space.

As another aspect of the detailed description, the protrusion member may be provided with a stopper protrusion stopped at at least part of the case in the second state. A stopping member formed to correspond to the stopper protrusion may be mounted in the first opening.

As another aspect of the detailed description, the cover unit may be connected to one end of the slide member and configured to be stopped at the first opening in a direction toward the inner space in the first state. Each of the guide rails may be formed from one end to another end of the case along an inner side surface of the case.

As another aspect of the detailed description, a closed loop for defining the first opening may be formed at one end of the case. The case may be formed by extending the closed loop in one direction so as to allow extrusion molding, and another end of the case may be provided with a second opening facing the first opening. An auxiliary case configured to obscure the second opening may be mounted to the second case.

As another aspect of the detailed description, front, side and rear surfaces of the cover unit may be flush with front, side and rear surfaces of the case, respectively. The case may be configured as an integral body such that the front, side and rear surfaces of the case are connected without boundaries.

As another aspect of the detailed description, the slider may further include a locking module. The locking module may be mounted to the cover unit and have locking units each stopped at at least part of the case to lock the slider in the first state. The locking module may include a base portion mounted to the cover unit, one end of each locking unit being rotatably connected to the base portion, a hook portion formed at another end of each locking unit and extending from the cover unit to be locked at a stopping groove, the stopping groove formed in the case, and a manipulation portion mounted to one surface of the cover unit to be movable in a direction to press the locking unit, such that the locking unit is rotated and thereby the hook portion is locked or unlocked at the stopping groove.

As another aspect of the detailed description, the manipulation portion may include a manipulation button disposed at a side surface of the cover unit and flush with the side surface of the cover unit in the locked state of the hook portion, and a manipulation protrusion protruding from the manipulation button into the cover unit between both ends of the locking unit so as to press the locking unit.

As another aspect of the detailed description, a window may be mounted to a front surface of the case, and a display may be disposed in the inner space to match with the window. The slide unit may be stacked with the display in the first state.

Also, the detailed description may provide a mobile terminal including a case having an inner space, and first and second openings formed at both ends thereof to open the inner space, a slider provided with a cover unit formed to obscure the first opening and a slide unit extending from the cover unit through the first opening, configured to house a battery, and slidably mounted to the case, and an auxiliary case mounted to the case to obscure the second opening. The cover unit may include a perpendicular portion formed at one end of the slide unit to cover the first opening, and an extending portion extending from the perpendicular portion to be away from the case, and having locking units mounted thereto, the locking unit being stopped at the case to lock the slider.

The foregoing and other objects, features, aspects and advantages of the present disclosure will become more apparent from the following detailed description when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Figure 1:
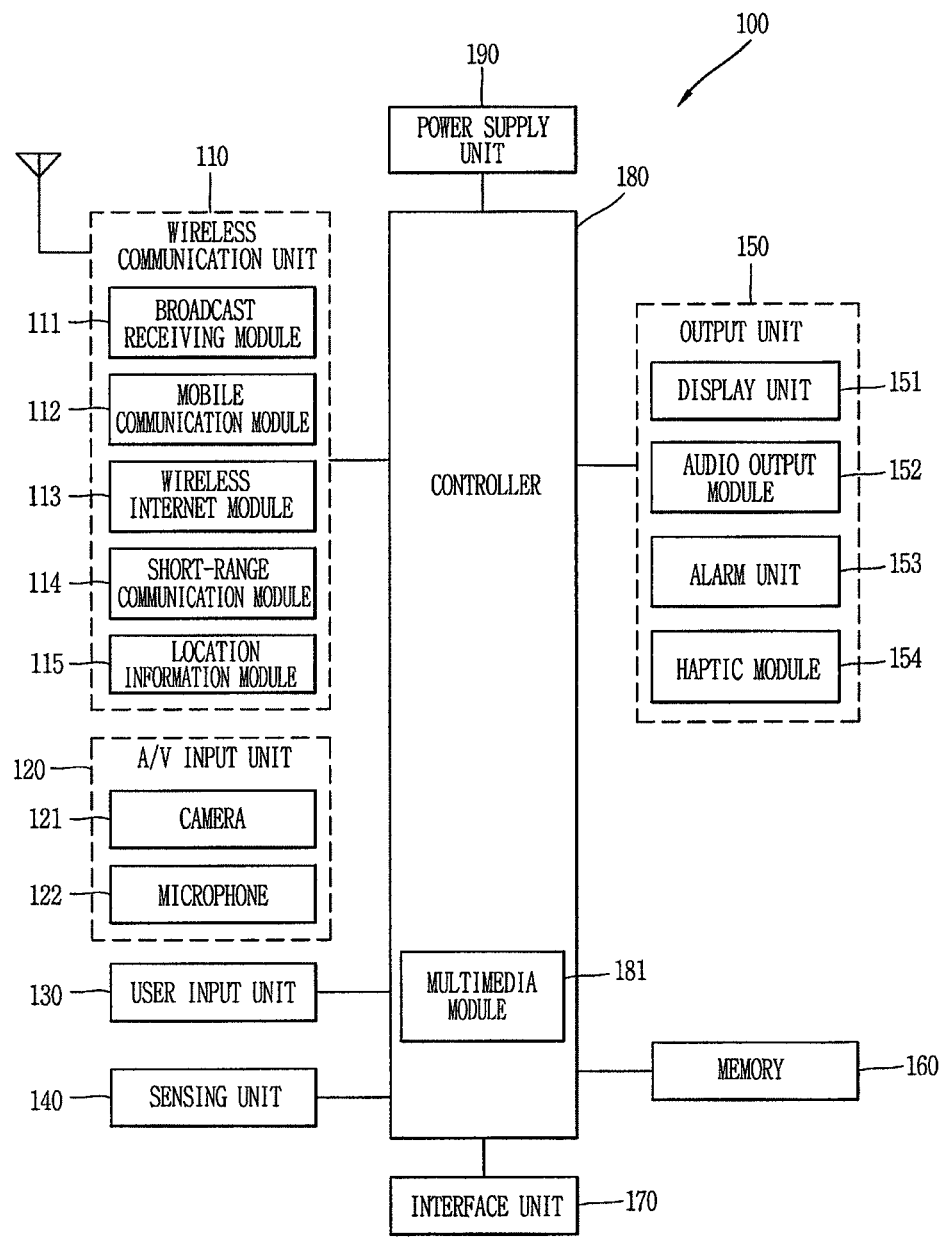
FIG. 1 is a block diagram of a mobile terminal in accordance with one exemplary embodiment.

Description will now be given in detail of a mobile terminal with reference to the accompanying drawings. Hereinafter, suffixes "module" and "unit or portion" for components used herein in description are merely provided only for facilitation of preparing this specification, and thus they are not granted a specific meaning or function. This specification employs like/similar reference numerals for like/similar components irrespective of different embodiments, so they all will be understood by the first description. The expression in the singular form in this specification will cover the expression in the plural form unless otherwise indicated obviously from the context.

Mobile terminals described in this specification may include mobile phones, smart phones, laptop computers, digital broadcasting terminals, personal digital assistants (PDAs), portable multimedia players (PMPs), navigators, and the like. However, it can be easily understood by those skilled in the art that the configurations according to the embodiments disclosed in this specification can be applied to stationary terminals, such as digital TV, desktop computer and the like, excluding several cases of being applicable only to mobile terminals.

FIG. 1 is a block diagram of a mobile terminal in accordance with one exemplary embodiment.

A mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more modules, which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position location module 115 and the like.

The broadcast receiving module 111 receives a broadcast signal and/or broadcast associated information from an external broadcast managing entity via a broadcast channel. The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The location information module 115 denotes a module for detecting or calculating a position of a mobile terminal. An example of the position location module 115 may include a Global Position System (GPS) module. According to the current technology, the GPS module 115 can measure accurate time and distance respectively from more than three satellites so as to accurately calculate a current position of the mobile terminal based on such three different distances according to a triangulation scheme. A scheme may be used to obtain time information and distance information from three satellites and correct error by one satellite. Specifically, the GPS module can further obtain three-dimensional speed information and an accurate time, as well as position on latitude, longitude and altitude, from the position information received from the satellites. Wi-Fi Positioning System and/or Hybrid Positioning System may be applied as the position location module 115.

Referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like. Here, if the touch pad and the display 151 to be explained later have a layered structure therebetween, the structure may be referred to as a touch screen.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device. Meanwhile, the sensing unit 140 may include a proximity sensor 141, which will be explained later in association with a touch screen.

The interface unit 170 may generally be implemented to interface the mobile terminal with external devices. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port. The interface unit 170 may serve as a path for external data or power to be transferred to various components in the mobile terminal 100 or internal data of the mobile terminal 100 to be sent to an external device.

Under a state that the mobile terminal 100 is connected to an external cradle, the interface unit 170 serves as a passage through which power from the external cradle is supplied to the mobile terminal 100, or a passage through which each kind of command signals input from the external cradle is transmitted to the mobile terminal 100. Each kind of command signals or power input from the cradle may serve as signals notifying that the mobile terminal 100 is precisely mounted to the external cradle.

The output unit 150 serves to output an audio signal (or an auditory signal), a video signal (or visual signal), an alarm signal or a tactile signal. The output unit 150 includes a display unit 151, an audio output module 152, an alarm 153 and the like.

The display unit 151 may output information processed in the mobile terminal 100. For example, when the mobile terminal is operating in a phone call mode, the display unit 151 will provide a User Interface (UI) or a Graphic User Interface (GUI) which includes information associated with the call. As another example, if the mobile terminal is in a video call mode or a capturing mode, the display unit 151 may additionally or alternatively display images captured and/or received, UI, or GUI.

Meanwhile, as aforesaid, if the display 151 and a touchpad have a layered structure therebetween so as to configure a touch screen, the display 151 may be used as an input device as well as an output device. The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, or the like.

Still referring to FIG. 1, a proximity sensor 141 may be arranged at an inner region of the mobile terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. Even if the proximity sensor 141 is not equipped, if the touch screen is a capacitance type, the proximity of a pointer may be detected based upon the changes in the electromagnetic field in response to the proximity of the pointer.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm unit 153 outputs signals notifying occurrence of events from the mobile terminal 100. The events occurring from the mobile terminal 100 may include call received, message received, key signal input, touch input, and so on. The alarm unit 153 may output not only video or audio signals, but also other types of signals such as signals notifying occurrence of events, for example, in a vibration manner. Upon a call signal or message being received, the alarm unit 153 may output vibration to notify the reception. Hence, the user can recognize the event generation by virtue of the vibration. Here, the signal for notifying the event generation may also be output via the display unit 151 or the audio output module 152.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a memory card type (e.g., SD or DX memory), Random Access Memory (RAM), Static Random Access Memory (SRAM), Read-Only Memory (ROM), magnetic memory, magnetic disk, optical disk, and the like. Also, the mobile terminal 100 may operate a web storage which performs the storage function of the memory 160 on the Internet.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply 190 provides power required by various components under the control of the controller 180. The provided power may be internal power, external power, or combination thereof.

Figure 2:
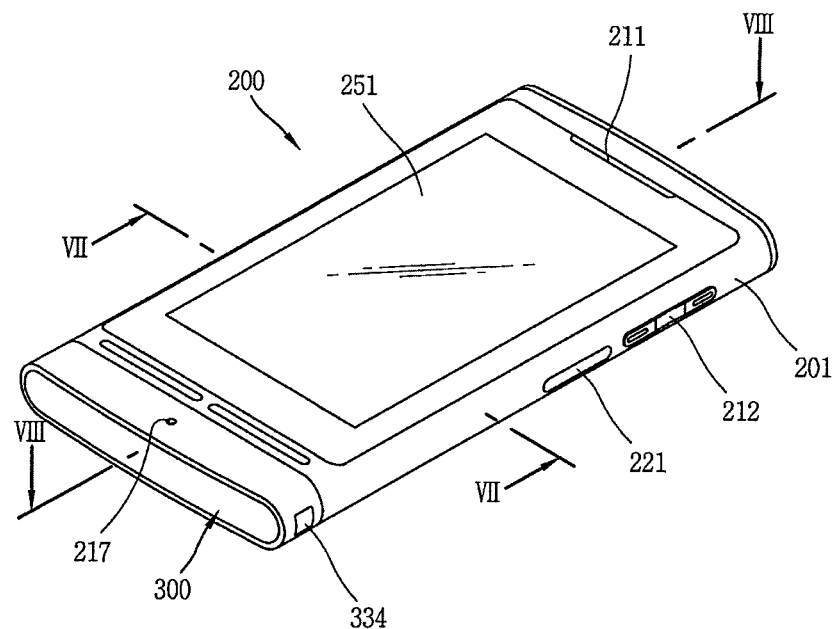
FIG. 2 is a front perspective view of a mobile terminal in accordance with one exemplary embodiment.
Figure 3:
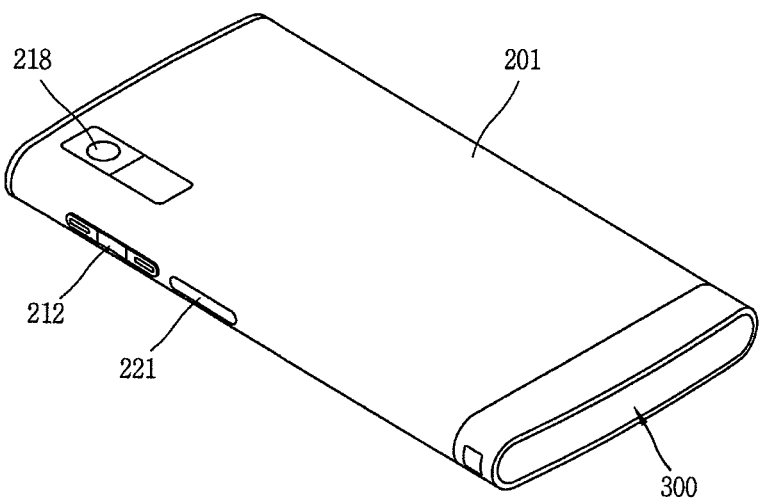
FIG. 3 is a rear perspective view of the mobile terminal.

FIG. 2 is a front perspective view of a mobile terminal in accordance with one exemplary embodiment, and FIG. 3 is a rear perspective view of the mobile terminal shown in FIG. 2.

A mobile terminal 200 disclosed in the detailed description has a bar-like body. However, the present disclosure is not limited to the type, but can be applied to various types, such as a slide type, a folder type, a swing type, a swivel type and the like, each having two or more bodies coupled to each other to be relatively movable.

A body of the terminal includes a case 201 (housing, casing, cover or the like) configuring an external appearance. With reference to FIGS. 2 and 3, the case 201 may be integrally formed without separation of a front case and a rear case. Various electronic components may be installed in a space formed by the case 201.

The case 201 may be injected using a synthetic resin or be formed of a metal, such as stainless steel (STS), titanium (Ti) or the like. Alternatively, the case 201 may be extruded, pulled out or drawn.

As shown in the drawings, the front face of the case 201 is shown having a display unit 251 and an audio output unit 211.

The display unit 251 may be implemented by LCD, OLED, e-paper and the like, all of which can display various visual information. The display unit 251 may include a touch detector, which allows touch inputs. Hence, if a touch input is detected on a particular portion of the display unit 251, a content corresponding to the touched portion is input. The contents input in the touch manner may be numbers or characters, instructions in various modes, selectable menu items or the like. The touch detector may be transparent such that the display unit 251 is visible therethrough, and have a structure of enhancing visibility of the touch screen in a bright place.

The audio output unit 211 may be implemented as a receiver for transferring conversation on a phone to a user's ear, or a loud speaker for outputting various alarm sounds or multimedia reproduction sounds.

An audio input unit 217 may be disposed on the front surface of the body at a position opposite to the audio output unit 211. The audio input unit 217 may be implemented, for example, as a microphone for receiving user's voices, other sounds and the like.

Side keys 212, an interface unit 221 and the like may be disposed at a side surface of the case 201.

The side keys 212 may be referred to as a manipulation unit, by which commands for controlling operations of the mobile terminal 200 are input. Various types of contents may be set to be input by the side keys 212. For example, some commands, such as controlling an image input unit 218, adjusting volume of sound output from the audio output unit 211, converting the display unit 251 into a touch recognition mode and the like, may be input by the side keys 212.

The interface unit 221 may be disposed at the side surface of the terminal body. The interface unit 221 may serve as a path through which the mobile terminal 200 and an external device can exchange data or the like.

An upper end surface or lower end surface of the terminal body may be shown having a type of the interface unit 221, for example, a jack (not shown) for connection of an ear-set and an IrDA port (not shown) for infrared communications.

An image input unit 218 may be disposed at a front or rear surface of the terminal body. As shown in FIG. 3, the image input unit 218 is disposed on the rear surface of the case 201. The image input unit 218 may separately be disposed on the front surface of the case 201 to be used for a user to capture his own face in a telephony call mode or the like. The image input unit 218 may be a camera, for example.

A flash (not shown) and a mirror (not shown) may further be disposed near the image input unit 218. The flash operates to emit light toward an object to be captured when taking the object using the image input unit 218. The mirror can cooperate with the image input unit 218 to allow a user to photograph himself in a self-portrait mode.

A power supply unit for supplying power to the mobile terminal 200 may be formed at the terminal body. The power supply unit may be mounted in the case 201. As one example, the power supply unit may be a battery 291 (see FIG. 4), which is installed in the mobile terminal 200 to supply power to at least some components.

Figure 4:
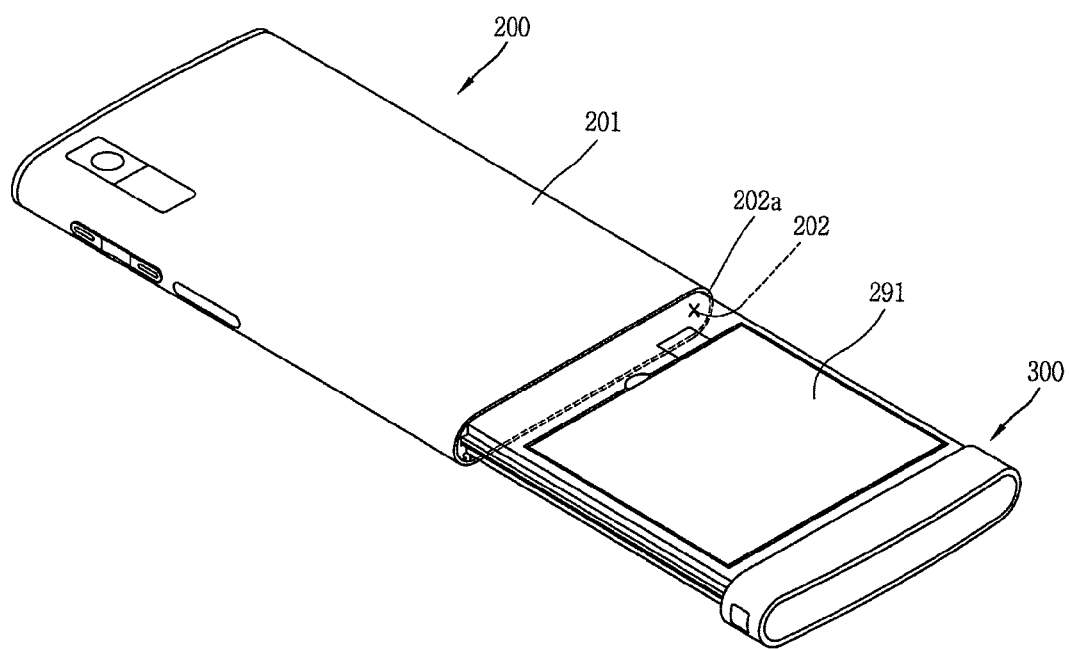
FIG. 4 is a state view showing a slid state of a slider of the mobile terminal shown in FIG. 3.

The battery 291 may be disposed in a state of being present within an inner space of the case 201 and in an externally exposed state (see FIG. 4). Hereinafter, a mechanism for varying a disposed state of the battery will be described in more detail.

FIG. 4 is a state view showing a slid state of a slider of the mobile terminal shown in FIG. 3. As shown in FIG. 4, the externally exposed state of the battery 291 may be referred to as a second state, and a state of the battery 291 being present within the inner space of the case 201 may be referred to as a first state.

Referring to FIG. 4, the case 201 may have a first opening at one end thereof for opening the inner space. A slider 300, which is configured to be slidable in at least one direction, may be inserted in the first opening 202. The slider 300 may be mounted to the case 201 and house the battery 291. The slider 300 may also be slidable between the first and second states through the first opening 202. In more detail, the portion of the slider 300 to house the battery 291 may be present within the inner space of the case 201 in the first state, and then externally exposed together with the slider 300 in the second state.

This exemplary embodiment illustrates, but is not limited to, a sliding motion as 'movement' of the slider 300 with respect to the terminal body. For example, the slider 300 may be implemented to be swung or swiveled with respect to the terminal body. The mobile terminal 200 may typically operate in an idle mode in the second state but the idle mode may be released by a user's manipulation.

Figure 5:
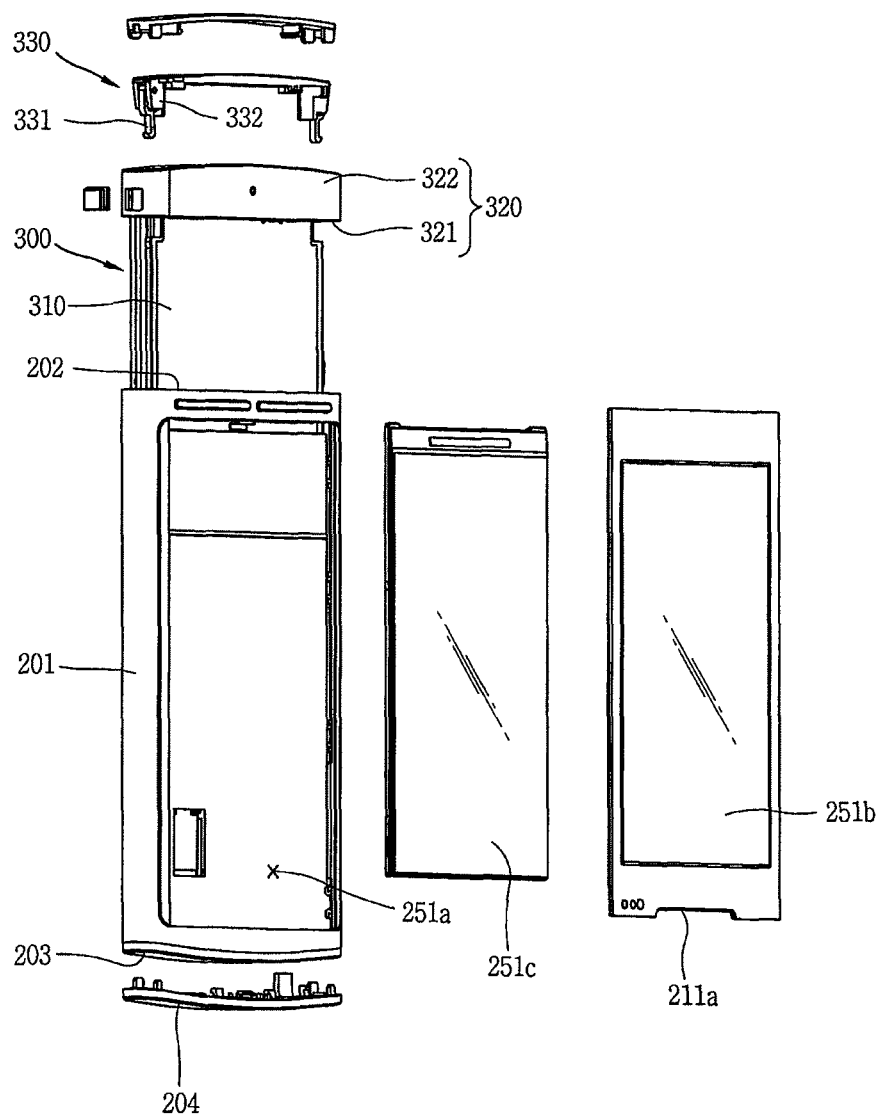
FIG. 5 is a disassembled view of the mobile terminal shown in FIG. 2.
Figure 6:
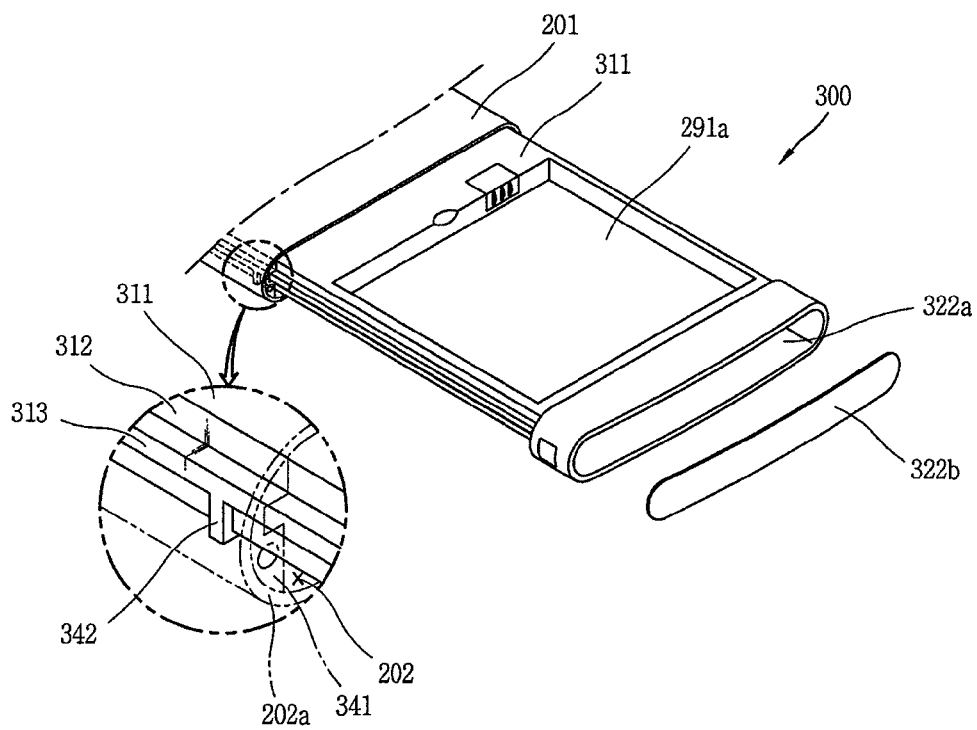
FIG. 6 is a rear perspective view of the slider shown in FIG. 4.
Figure 7:
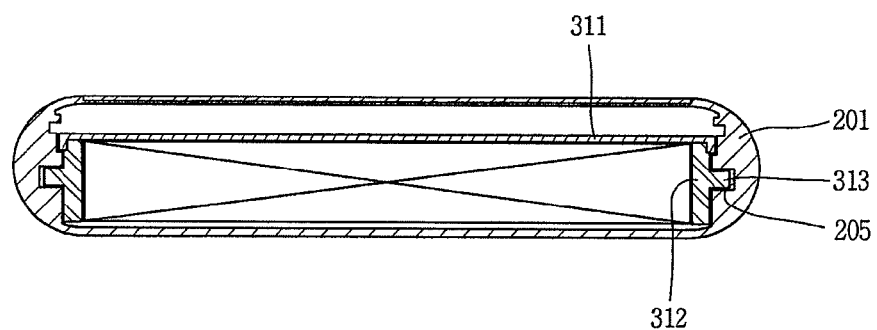
FIG. 7 is a sectional view taken along the line VII-VII of FIG. 2.

FIG. 5 is a disassembled view of the mobile terminal shown in FIG. 2, FIG. 6 is a rear perspective view of the slider shown in FIG. 4, and FIG. 7 is a sectional view taken along the line VII-VII of FIG. 2.

Referring to FIG. 5, the case 201 may be formed by extending the same section in one direction. For example, the case 201 may be formed of aluminum and fabricated by an extrusion molding.

A closed loop 202a (see FIG. 4) for defining the first opening 202 may be formed at one end of the case 201. Also, a second opening 203 for opening the inner space of the case 201 may be formed at another end of the case 201. That is, the case 201 may be formed by extending the closed loop 202a in one direction such that the case 201 can be fabricated by the extrusion molding. The first and second openings 202 and 203 may be disposed to face each other and formed in the same shape. Also, the case 201 may be formed of aluminum to be appropriate for the extrusion molding.

As shown, the case 201 may be integrally formed such that front, side and rear surfaces thereof can be connected without boundaries. Consequently, the case of the terminal without parting lines (boundaries between cases) on surfaces may be implemented.

An auxiliary case 204 for obscuring the second opening 203 may be mounted to the case 201. The auxiliary case 204 may have an outer appearance with a shape matching with a section of another end of the case 201, thereby not protruding from the front, side or rear surface of the case 201 in the state of obscuring the second opening 203.

As shown, a window 251b may be mounted to the front surface of the case 201. For example, the case 201 may include a window hole 251a, and the window 251b may be disposed to match with the window hole 251a.

The window 251b may be formed of a transparent material, example of which may include a transparent synthetic resin, tempered glass and the like. Here, the window 251b may include a portion, through which light cannot be transmitted. Such portion may be made of a non-transparent material or be a surface-processed region to block light transmission. The window 251b may include an audio hole 211a corresponding to the audio output unit 211. A speaker, a receiver or the like may be disposed to face the audio hole 211a.

A display 251c may be disposed in the inner space of the case 201 to correspond to the window 251b. The display 251c may display visual information, and be LCD, OLED or the like. The window 251b and the display 251c may cooperatively configure the display unit 251 (see FIG. 2).

As shown, the slider 300 may be disposed to be stacked with the display 251c, and slidably mounted in the case 201. The slider 300 may be configured to be slidable through the first opening 202 between the first and second states.

Referring to FIGS. 5 and 6, the slider 300 may include a slide unit 310 and a cover unit 320.

The cover unit 320 may be formed to block the first opening 202, and the slide unit 310 may extend through the first opening 202 and be slidably mounted to the case 201.

More concretely, the slide unit 310 may house the battery 291 therein (see FIG. 4), and be slid out of the inner space of the case 201. That is, the slide unit 310 may be stacked with the display 251c in the first state, and drawn away from the display 251c in a lengthwise direction of the case 201 in the second state.

Referring to FIGS. 6 and 7, the slide unit 310 may include a slide member 311, protrusion members 312 and a guide member 313.

The slide member 311 may be in parallel to the front and rear surfaces of the case 201. For example, the slide member 311 may be formed as a plate member, and inserted in the inner space of the case 201 through the first opening 202 so as to be stacked on the display 251c in the first state.

The protrusion members 312 may protrude towards the rear surface of the case 201 at both side surfaces of the slide member 311, thereby defining a housing space 291a for housing the battery 291 (see FIG. 4) therein. The housing space 291a may be in a recessed form such that the battery 291 can be mounted therein. A connection terminal connected to the battery 291 may be installed at the housing space 291a.

The guide member 313 may be formed at each protrusion member 312 and slidably coupled to a guide rail 205 disposed at the case 201. Each guide rail 205 may be formed at an inner side surface of the case 201, more particularly, extend from one end to another end of the case 201. Consequently, the guide rail 205 can be simply implemented by the extrusion molding.

The guide member 313 may be inserted in the guide rail 205. The guide member 313 may protrude from a surface of the protrusion member 312 and extend in its sliding direction to be slidable along the guide rail 205.

Referring back to FIGS. 5 and 6, the cover unit 320 may be formed to be stopped at the first opening 202 in a direction towards the inner space of the case 201 in the first state. That is, the cover unit 320 may serve as a stopper of the slide member 311.

As shown, the cover unit 320 may include a perpendicular portion 321 and an extending portion 322.

The perpendicular portion 321 may be formed at one end of the slide unit 310 in a direction perpendicular to the sliding direction so as to cover the first opening 202. More particularly, the perpendicular portion 321 may be formed at the one end of the slide member 311 to be perpendicular to the front surface of the slide member 311, and disposed to obscure the first opening 202 in the first state. Also, the perpendicular portion 321 may have a shape corresponding to an outer circumference of the closed loop 202a. Accordingly, an outer surface of the perpendicular portion 321 may not protrude from the front, side or rear surface of the case 201 in the state of obscuring the first opening 202.

The extending portion 322 may extend from the perpendicular portion 321 to be farther away from the case 201 in a sliding direction of the slide 300. The extending portion 322 may have an inner space for accommodating components therein, and an outer surface thereof may be flush with the front, side and rear surfaces of the case 201. Consequently, the front, side and rear surfaces of the cover unit 320 may be connected with the same height from the front, side and rear surfaces of the case 201, respectively.

The extending portion 322 may include a mounting space 322a and a cover 322b.

The mounting space 322a may indicate a space in which components are mounted. The mounting space 322a may be recessed into an end of the extending portion 322 in a direction to be closer to the case 201. The cover 322b may be formed to cover the mounting space 322a.

The slider 300 may include a locking module 330 mounted to the cover unit 320. The locking module 330 may include locking units 331 mounted in the mounting space 322a and stopped at at least part of the case 201 so as to lock the slider 300 in the first state. Also, the slider 300 may include a stopping member 341 so as to be stopped in the second state. Hereinafter, the structures of the locking module 330 and the stopping member 341 will be described in more detail.

Figure 8:
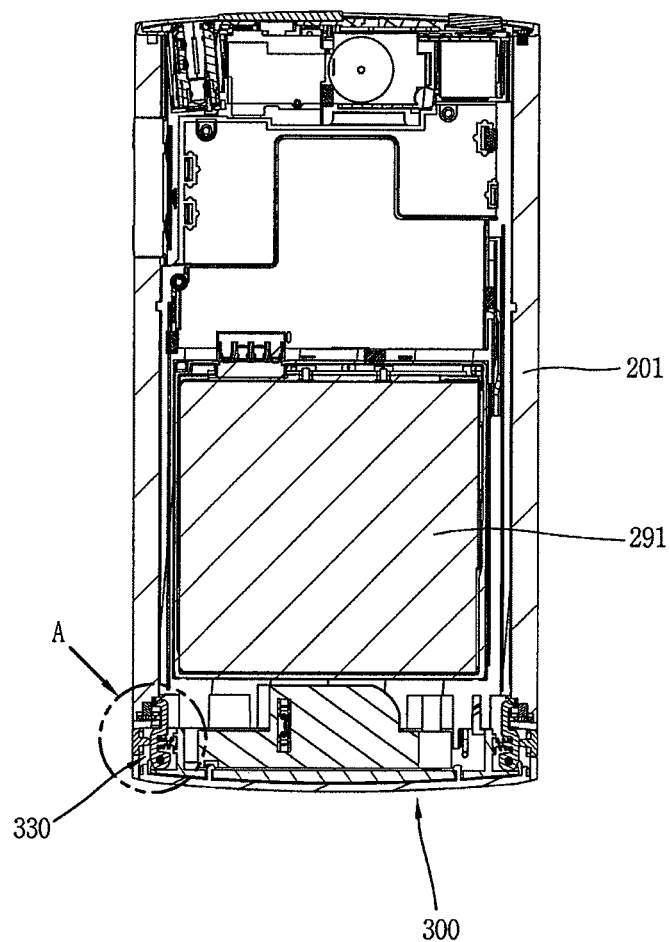
FIG. 8 is a sectional view taken along the line VIII-VIII of FIG. 2.
Figure 9:
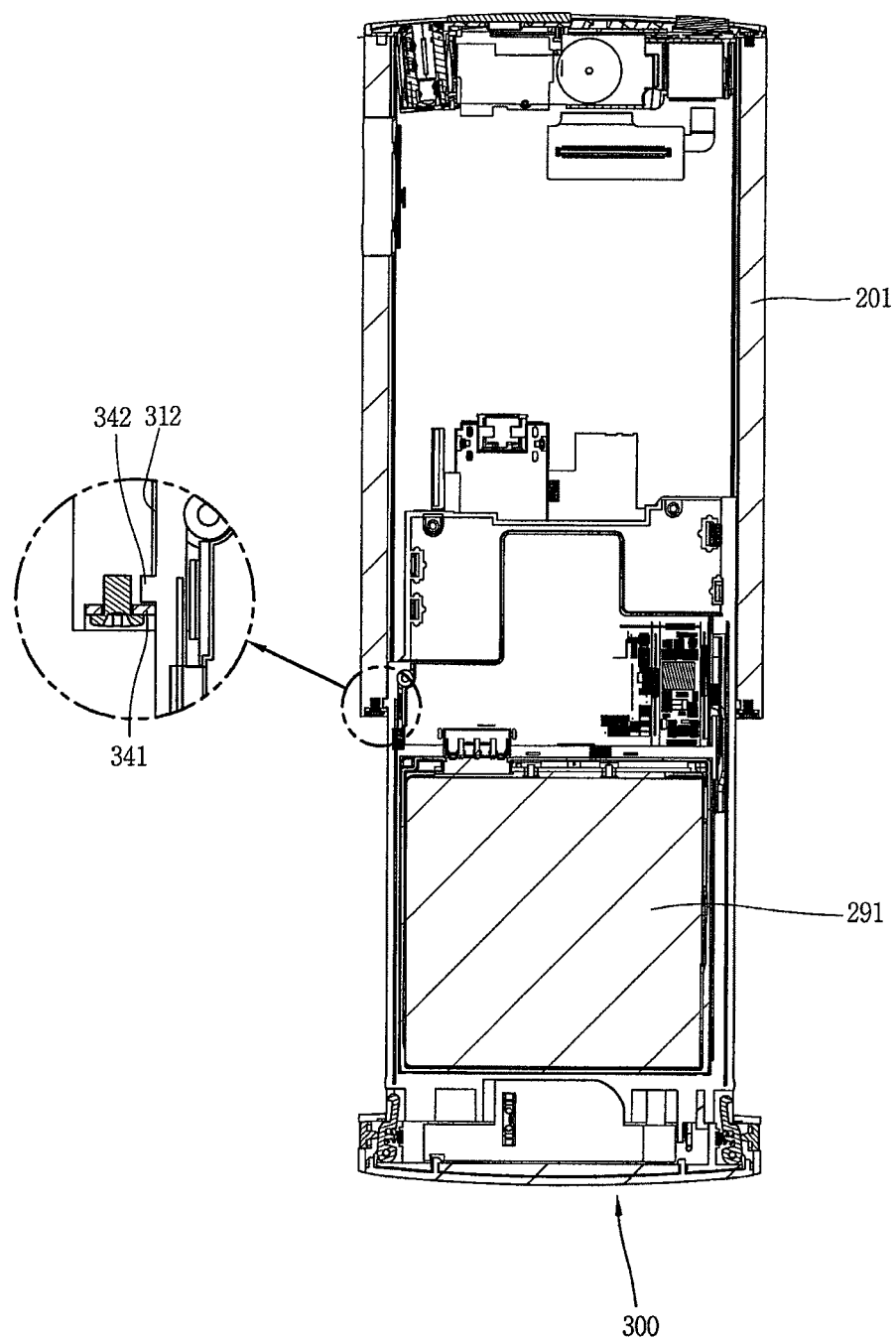
FIG. 9 is a state view showing a slid state of the slider of the mobile terminal shown in FIG. 8.
Figure 10A:
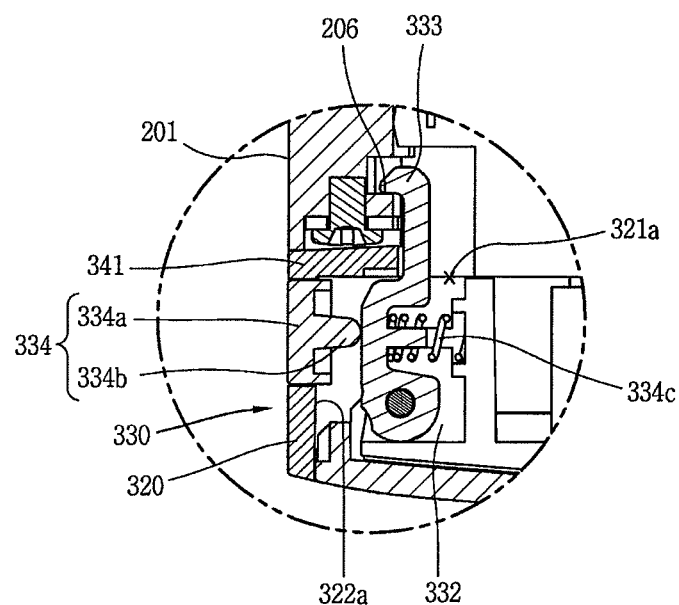
FIGS. 10A to 10C are an enlarged view of part A of FIG. 8, an operation view of a manipulation unit and an enlarged view of a locking module, respectively.
Figure 10B:
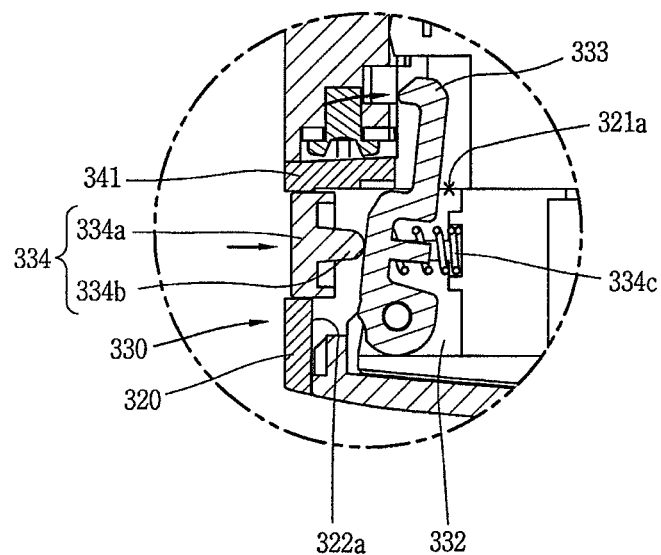
Figure 10C:
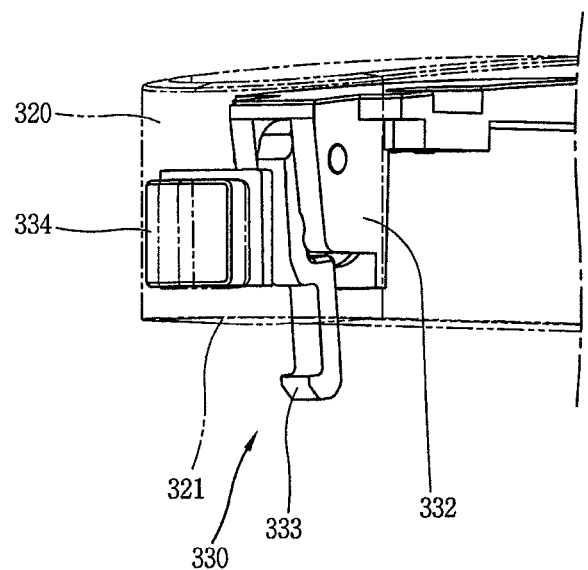

FIG. 8 is a sectional view taken along the line VIII-VIII of FIG. 2, FIG. 9 is a state view showing a slid state of the slider of the mobile terminal shown in FIG. 8, FIG. 10A is an enlarged view of part A of FIG. 8, FIG. 10B is an operation view of a manipulation unit of FIG. 10A and FIG. 10C is an enlarged view of the locking module.

Referring to FIGS. 8, and 10A to 10C, the locking module 330 may include a base portion 332, a hook portion 333 and a manipulation portion 334.

The base portion 332 may be mounted in the cover unit 320, and form a bracket, to which each component of the locking module 330 is coupled. For example, the base portion 332 may be inserted into the mounting space 322a, and one end of the locking unit 331 may be rotatably connected to the base portion 332. The locking unit 331 may be provided in plurality at both side surfaces of the cover unit 320. The plurality of locking units 331 may be mounted to both ends of the base portion 332. In more detail, one end of each locking unit 331 may be mounted to the base portion 332 by a hinge.

The hook portion 333 may be formed at another end of the locking unit 331, and extend from the cover unit 320 through a through hole 321a, which is provided at the perpendicular portion 321 of the cover unit 320. The hook portion 333 may then be locked at a stopping groove 206 formed at the case 201. Referring to the drawings, the stopping groove 206 may be formed at, but not limited to, the stopping member 341 mounted to an end of the guide rail 205. For example, the stopping groove 206 may be recessed into an inner side surface of the case 201 in a direction toward an outer side surface of the case 201.

The manipulation portion 334 may be mounted to one surface of the cover unit 320 to be movable in a direction of pressing the locking unit 331, such that the locking unit 331 is rotated and accordingly the hook portion 333 can be locked or unlocked at the stopping groove 206. More particularly, the manipulation portion 334 may include a manipulation button 334a and a manipulation protrusion 334b.

The manipulation button 334a may be disposed at a side surface of the cover unit 320. More concretely, the manipulation button 334a may be provided in plurality. The plurality of manipulation buttons 334a may be mounted to both side surfaces of the cover unit 320 so as to be flush with the side surface of the cover unit 320 in the locked state of the hook portion 333. Hence, in the first state, the manipulation buttons 334a may configure an integral appearance with the case 201.

The manipulation protrusion 334b may protrude from the manipulation button 334a into the cover unit 320 between both ends of the locking unit 331 to press the locking unit 331. For example, the manipulation protrusion 334b is inserted into a spring 334c and the spring 334c supports the locking unit 331, so the manipulation button 334a can return to the original position after a user's manipulation.

Referring to FIGS. 9 and 6, the slider 300 may stop sliding in the second state by a stopping member 341 and a stopper protrusion 342.

The stopper protrusion 342 stopped at at least part of the case 201 in the second state may be formed at the protrusion member 312 of the slider 300. The stopper protrusion 342 may protrude from the surface of the protrusion member 312 toward the inner space of the case 201.

Referring to the drawings, the stopping member 341 formed to correspond to the stopper protrusion 342 may be mounted to the first opening 202 of the case 201. The stopping member 341 may be formed such that at least part thereof can overlap with the stopper protrusion 342 in a sliding direction. Also, the stopping groove 206, in which the locking unit 331 is locked, may be provided at the stopping member 341.

With such structure, a mechanism for attaching or detaching a battery can be implemented more simply in the case without a parting line. In more detail, the slider slid through the opening of the case allows implementation of a case of the terminal without a parting line (i.e., a boundary between cases) on a surface.

Also, by virtue of a case in a shape having openings at both ends and having a closed loop extending in one direction, the case can be molded by extrusion, which derives more reduction of the fabrication costs thereof, resulting in mass production of an aluminum case.

In addition, as the battery is externally exposed by sliding of the slider, the attachment and detachment of the battery can be facilitated, and also the terminal can be made slimmer.

The foregoing embodiments and advantages of the constructions and methods are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a case defining an inner space, the case having a first opening formed at one end thereof to expose the inner space, a front surface having a window mounted thereon and guide rails located at the case;

a battery locatable in the inner space; and
a slider mounted to the case, the slider being configured to hold the battery and to be slidable through the first opening between a first state where the battery is disposed in the inner space and a second state where the battery is exposed externally of the case, the slider including:
  a slide unit slidably mounted to the case to be drawn out of the inner space, the slide unit being configured to hold the battery therein, the slide unit including:
    a slide member provided in parallel to the front surface of the case;
    protrusion members protruding from opposite side surfaces of the slide member, the protrusion members defining a housing space for holding the battery; and
    a guide member formed at each of the protrusion members, the slide member being slidably coupled to the guide rails; and
  a cover unit connected to the slide unit and configured to obscure the first opening in the first state.

2. The terminal of claim 1, wherein the cover unit includes:
a perpendicular portion provided at one end of the slide member, the perpendicular portion extending normal to the front surface of the case; and
an extending portion extending from the perpendicular portion in a sliding direction of the slider.

3. The terminal of claim 2, wherein the perpendicular portion is configured to obscure the first opening when the slider is in the first state.

4. The terminal of claim 2, wherein the extending portion includes:
a mounting space located in an end of the extending portion;
a pair of locking units located in the mounting space, the locking units being configured to engage at least part of the case to lock the slider in the first state; and
a cover configured to cover the mounting space.

5. The terminal of claim 1, wherein at least one of the protrusion members is provided with a stopper protrusion, the stopper protrusion being configured to engage at least part of the case in the second state.

6. The terminal of claim 5, wherein the case includes a stopping member formed to correspond to the stopper protrusion, the stopping member being located in the first opening.

7. The terminal of claim 1, wherein the cover unit is connected to one end of the slide member and is configured to be stopped at the first opening when the slider is in the first state.

8. The terminal of claim 1, wherein each of the guide rails extends from the first opening towards an end of the case opposite the first opening at the inner space.

9. The terminal of claim 1, wherein one end of the case provides a closed loop defining the first opening.

10. The terminal of claim 9, wherein a second opening is provided at another end of the case opposite the first opening.

11. The terminal of claim 10, wherein the case is formed by extrusion molding.

12. The terminal of claim 10, further comprising an auxiliary case located at the second opening, the auxiliary case being configured to obscure the second opening.

13. The terminal of claim 9, wherein the cover unit is flush with the case in the first state.

14. The terminal of claim 9, wherein the case is a single piece member such that a front surface, rear surface, and side surfaces of the case are provided without boundaries.

15. A mobile terminal comprising:
a case defining an inner space, the case having a first opening formed at one end thereof to expose the inner space and stopping grooves located at the inner space;
a battery locatable in the inner space; and
a slider mounted to the case, the slider being configured to hold the battery and to be slidable through the first opening between a first state where the battery is disposed in the inner space and a second state where the battery is exposed externally of the case, the slider including:
  a slide unit slidably mounted to the case to be drawn out of the inner space, the slide unit being configured to hold the battery therein;
  a cover unit connected to the slide unit and configured to obscure the first opening in the first state; and
  a locking module mounted to the cover unit, the locking module including locking units configured to engage at least part of the case to lock the slider in the first state, the locking module including:
    a base portion mounted to the cover unit, one end of each locking unit being rotatably connected to the base portion;
    a hook portion formed at another end of each locking unit, each hook portion extending from the cover unit to be locked at one of the stopping grooves formed in the case; and
    a manipulation portion mounted to one surface of the cover unit, the manipulation portion being movable in a direction to press the locking unit, thereby causing the locking unit to be rotated such that the hook portion is disengaged from the stopping groove when the manipulation portion is pressed.

16. The terminal of claim 15, wherein the manipulation portion includes:
a manipulation button disposed at the one surface of the cover unit, the manipulation button being flush with the one surface of the cover unit in when the hook portion is in the locked state; and
a manipulation protrusion protruding from the manipulation button into the cover unit between both ends of the locking unit so as to contact the locking unit.

17. The terminal of claim 1, further comprising:
a window mounted to a front surface of the case; and
a display disposed in the inner space opposite the window, wherein the slide unit is stacked with the display in the first state.

18. A mobile terminal comprising:
a case defining an inner space, the case having first and second openings formed at opposite ends thereof to expose the inner space;
a slider having a cover unit fondled to obscure the first opening and a slide unit extending from the cover unit through the first opening, the slide unit being slidably mounted to the case and configured to hold a battery; and
an auxiliary case mounted to the case to obscure the second opening,
wherein the cover unit includes:
  a perpendicular portion formed at one end of the slide unit to cover the first opening;
  an extending portion extending from the perpendicular portion in a direction away from the case; and
  locking units mounted to the extending portion, each locking unit being configured to be stopped at the case to restrict movement of the slider.

* * * * *